United States Patent [19]
Thelwall

[11] Patent Number: 5,201,957
[45] Date of Patent: Apr. 13, 1993

[54] SUGAR PRODUCTION APPARATUS

[75] Inventor: John C. D. C. Thelwall, Derby, England

[73] Assignee: Fletcher Smith Limited, Derby, United Kingdom

[21] Appl. No.: 809,539

[22] PCT Filed: Jul. 27, 1990

[86] PCT No.: PCT/GB90/01172
§ 371 Date: Mar. 2, 1992
§ 102(e) Date: Mar. 2, 1992

[87] PCT Pub. No.: WO91/01785
PCT Pub. Date: Feb. 21, 1991

[30] Foreign Application Priority Data
Jul. 28, 1989 [GB] United Kingdom ............... 8917313

[51] Int. Cl.$^5$ ............................ C13D 3/00; C13F 1/00
[52] U.S. Cl. ............................................ 127/9; 127/16
[58] Field of Search ............................ 127/9, 16

[56] References Cited
U.S. PATENT DOCUMENTS
3,687,636 8/1972 Dambrine et al. ............... 127/16
3,879,215 4/1975 De Villiers et al. ............... 127/16

FOREIGN PATENT DOCUMENTS
1190243 4/1970 United Kingdom .

Primary Examiner—Theodore Morris
Assistant Examiner—P. L. Hailey
Attorney, Agent, or Firm—W. Thad Adams, III

[57] ABSTRACT

An evaporator in the form of a vacuum pan has partitions (38) providing a plurality of compartments (42, 46) between an inlet and outlet. The compartments increase in volume from the inlet to the outlet, each compartment having at least one pair of hollow fins (50). A pair of shafts (32) pass through the partitions (38) to provide vanes (58) in each compartment. The vanes (58) pass over the surfaces of the respective fins (50) to agitate fluid in the vacuum pan, the fluid passing from compartment to compartment by way of weirs. The number of fins (50) in each compartment increases from the inlet to the outlet, and the fins (50) may be heated, as may be the vanes (58). The apparatus is advantageous in preparing crystalline sugar from sugar solution, providing for even dispersal of sugar crystals and keeping the massecuite in motion before the latter in its most concentrated state leaves the compartment (46) for further processing.

12 Claims, 2 Drawing Sheets

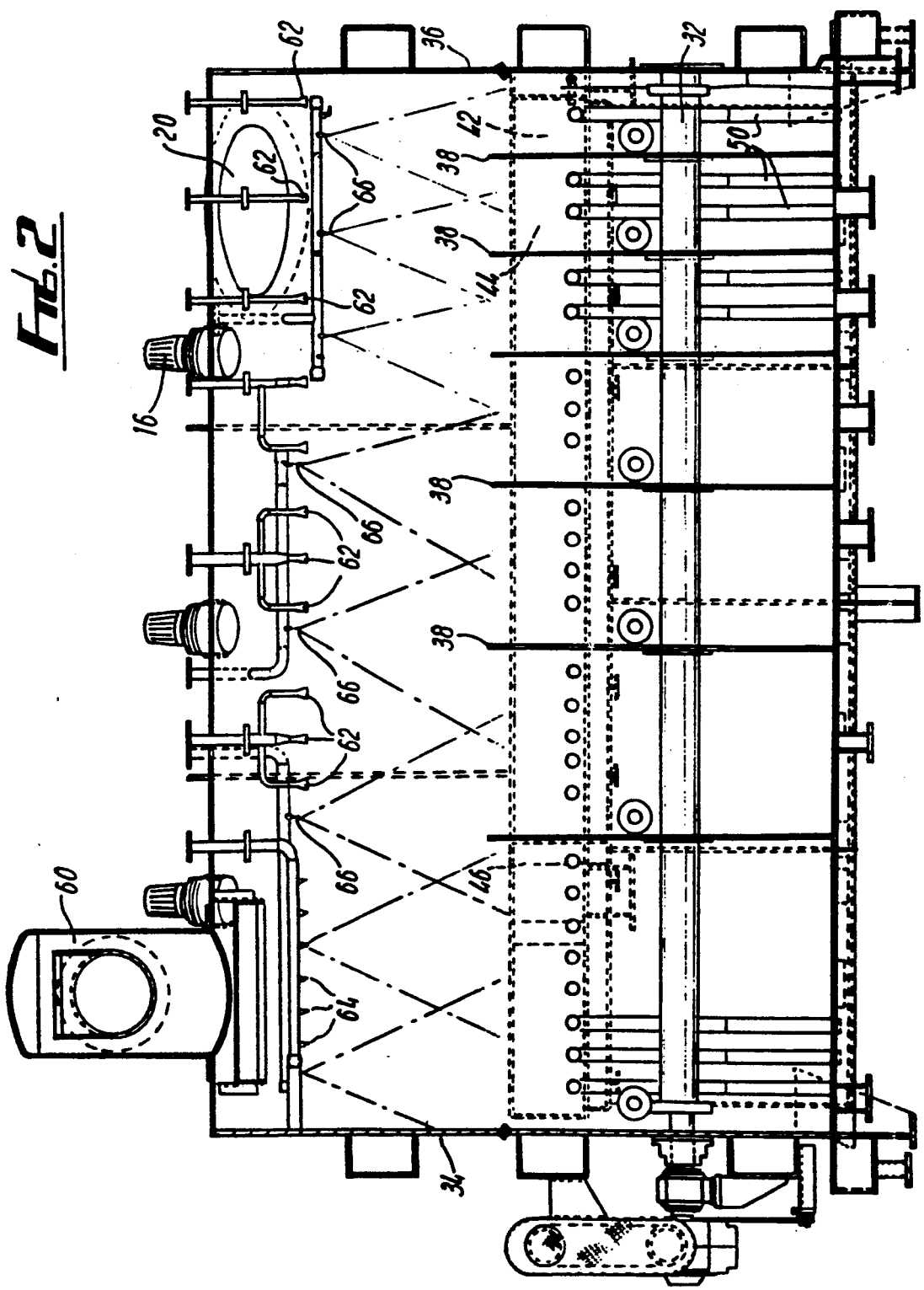

SUGAR PRODUCTION APPARATUS

This application is a PCT application. This application claims the priority date of Jul. 28, 1989 for Great Britain Patent No. 8917313.2.

This invention concerns improvements in or relating to sugar production apparatus and particularly to evaporators where crystalline sugar is prepared from sugar solution.

Various apparatus have been proposed in the past, for example that disclosed in U.K. Patent No. 1190243. Past evaporators have either been batch evaporators in which sugar is processed in successive batches or alternatively continuous evaporators where production is continuous. A disadvantage of all such apparatus is the formation of sugar crystals on the evaporator walls and other components of the apparatus, such crystal formation reducing the efficiency of the apparatus.

It is an object of the present invention to provide a continuous evaporator in which the disadvantages of prior evaporators are obviated or mitigated.

According to the present invention there is provided an evaporator including a shell, at least part of which is partitioned, between an inlet and an outlet, into a plurality of transversely extending compartments by spaced partitions over which, in use, fluid may flow from each compartment to the adjacent downstream compartment, at least one heating fin extending transversely into each compartment, and at least one rotatable, longitudinally extending shaft extending through the shell and being provided with vanes which pass over the surface of the respective fins to agitate the fluid to be evaporated within the compartments.

Preferably a pair of the rotatable shafts are provided in a parallel relation, the vanes on one shaft being staggered with respect to the vanes on the other shaft so that they inter-mesh.

Preferably also, in a direction from inlet to outlet, the number of fins in each of the compartments increases. The fins may be steam heated, and at least one pair of the fins may be arranged in each compartment to extend towards each other from respective sides of the shell.

Outer walls of the shell in the region of each compartment may be steam heated, and also the or each shaft may be steam heated. Further, the vanes may be steam heated.

Preferably each partition is provided with a weir in an edge to control fluid passing thereover.

Preferably also the or each fin is supported on the shell such that there is a gap defined between the fin and the shell.

Means may be provided for maintaining the shell at sub-atmospheric pressure, and means may be provided for introducing make-up fluid into the compartments, the fluid introduction means comprising, for example, nozzles located above the compartments. The nozzles may deliver a curtain of make-up fluid or a spray. The shell may also be provided with vapour extraction means.

Further according to the present invention there is provided an evaporator including a shell, at least part of which is partitioned, between an inlet and an outlet, into a plurality of transversely extending compartments by spaced partitions over which, in use, fluid may flow from each compartment to the adjacent downstream compartment, heating means for heating the fluid, and fluid make-up means located above the compartments for introducing make-up fluid into the evaporator.

The fluid make up means may be nozzles adapted to deliver fluid as a curtain or a spray. Agitation means may be provided in each compartment, and heat transfer fins may be provided in each compartment.

BRIEF DESCRIPTION OF THE DRAWINGS

An embodiment of the present invention will now be described by way of example only with reference to the accompanying drawings in which:

FIG. 2 is a longitudinal elevation.

DESCRIPTION OF THE PREFERRED EMBODIMENT

Figure 1:
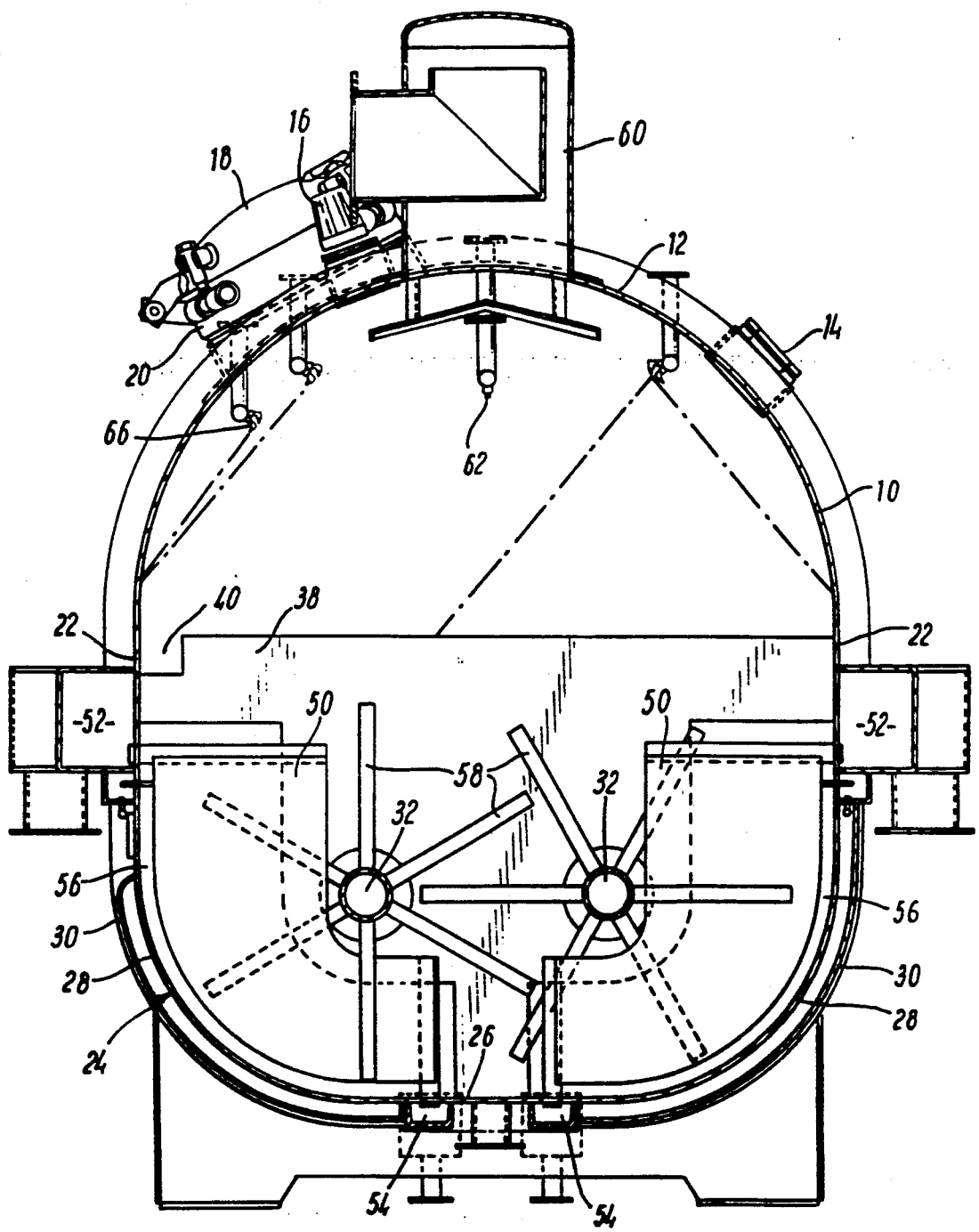
FIG. 1 is a transverse elevation through an evaporator.

An evaporator in the form of a vacuum pan comprises a shell 10 having an arcuate top 12 incorporating sight glasses 14, illumination means 16 and a hatch 18 on a manway 20, none of which form part of the present invention and will not be described in detail. The top 12 is connected to a base 24 by straight sided walls 22, the base comprising a centre flat portion 26 and two upwardly arcuate walls 28. The latter are each provided with a spaced, external wall 30 whereby heating steam may be supplied to the spacings between the walls 28, 30, to provide a heating jacket.

Two hollow rotatable shafts 32 extend through the evaporator from an end wall 34 to an opposed end wall 36 in a parallel relation. Each shaft passes through a plurality of spaced partitions 38 which extend from the base of the evaporator to a point just above the half-way mark and are each provided at one side of an upper edge with a weir 40 so that sugar and water solution, or massecuite, may flow from an inlet compartment 42 defined between the end wall 36 and the first partition 38, to a neighbouring compartment 44 and so on to the end compartment 46, seven compartments in all being provided, the compartments increasing in volume from inlet to outlet.

Each compartment includes at least one pair of hollow fins 50 each of the fins being supported from a respective one of the arcuate walls 28 and the base 26 but spaced therefrom by a gap 56. The fins 50 are hollow such that heating steam can pass therethrough from an inlet manifold 52 to an outlet manifold 54. The number of fins 50 increases from the inlet compartment 42 which has one pair, to the outlet compartment 46 which has eight pairs. Each shaft 32 has a plurality of vanes 58 radially extending therefrom. The vanes are arranged in spaced apart sets of six, and each set, on rotation of the respective shaft, sweeps the space between adjacent fins 50 or adjacent fins and partitions. The vanes 58 on one shaft are staggered with respect to those on the other shaft so that they "intermesh" to ensure good agitation of the massecuite in each compartment.

A vapour extraction arrangement 60 is provided in the roof 12 of the evaporator adjacent the outlet end wall 34, and supported from the roof 12 there are provided a plurality of syrup introduction nozzles 62 for supplying a curtain of syrup into the compartments. The nozzles 64 above the outlet compartment 46 supply sprays of syrup. Also suspended from the roof 12 are a plurality of sprays 66 for spraying syrup onto the surface of the massecuite, the partitions, and the evaporator walls to wash any crystals forming on the walls into the massecuite.

In operation, massecuite with seed crystals therein fills each compartment and steam is supplied to the fins 50 and to the external heating jacket. Water evaporates from the massecuite thereby increasing the degree of super saturation and causing more sugar to deposit onto the surface of the crystals present. The agitating action of the vanes 58 in each compartment causes an even dispersal of the sugar crystals and controls their size. As the vanes 58 pass close to the fins 50 they ensure that the massecuite in contact with the fins and partitions is always in motion, thus reducing the tendancy for crystals to form on the fins or settle out of the massecuite. Similarly the tips of the vanes sweep close to the arcuate walls 24 and reduce the tendancy for crystals to form on these walls. It is known that crystals tend to form at sharp angles and consequently the gap 56 between the fins and the arcuate walls 28 is provided to encourage circulation along the length of the wall 28 thereby reducing crystal formation at this point. The introduction of make-up syrup through the nozzles 62 increases the volume of massecuite in each compartment and concentrated massecuite flows over the respective weir 40 into the adjacent downstream compartment where further evaporation takes place, the more concentrated massecuite then passing to the next compartment, and being in its most concentrated state in the end compartment 46 from which it leaves the apparatus for further processing. The water vapour separated from the massecuite is exhausted from the sub-atmospheric shell 10 by the extractor assembly 60.

Various modifications can be made without departing from the scope of the invention. For example heating steam can be fed to the hollow shafts 32 to increase the evaporation effect within the massecuite and to heat the vanes 58 to reduce the formation of crystals thereon. The vanes themselves may have steam passages therethrough and may have an oval cross-section. The vanes of each set may be arranged in the same plane or may be in a spiral arrangement to further enhance agitation.

The number of compartments can be varied and different means can be provided for making up the massecuite in each compartment. For example the nozzles 62 can be replaced by feed means in the base of each compartment. The base of the shell may be curved instead of flat over the portion 26.

I claim:

1. An evaporator including a shell having an inlet and an outlet, at least one heating fin extending into the shell, and at least one rotatable shaft extending through the shell, characterised in that, at least part of the shell (10) is partitioned between the inlet and the outlet into a plurality of transversely extending compartments (42-46) by spaced partitions (38) over which, in use, fluid may flow from each compartment to the adjacent downstream compartment, at least one heating fin (50) extending transversely into each compartment, each fin (50) being supported on the shell (10) such that there is a gap defined between the fin (50) and the shell (10), and the rotatable, longitudinally extending shaft (32) being provided with vanes (58) which pass over the surface of the respective fins (50) to agitate the fluid to be evaporated within the compartments (42-46), including the fluid at the surfaces of the fins (50) and the fluid in the gaps between the fins (50) and the shell (10).

2. An evaporator according to claim 1, characterised in that a pair of the rotatable shafts (32) are provided in a parallel relation, the vanes (58) on one shaft being staggered with respect to the vanes (58) on the other shaft so that they inter-mesh.

3. An evaporator according to claim 1, characterised in that the shaft (32) is steam heated.

4. An evaporator according to claim 2, characterised in that each shaft (32) is steam heated.

5. An evaporator according to claim 1 or 2, characterised in that in a direction from inlet to outlet, the number of fins (50) in each of the compartments increases.

6. An evaporator according to claim 1 or 2, characterised in that at least one pair of the fins (50) is provided in each compartment (42-46) to extend towards each other from respective sides of the shell (10).

7. An evaporator according to claim 1 or 2, characterised in that the outer walls of the shell (10) in the region of each compartment are steam heated.

8. An evaporator according to claim 1 or 2, characterised in that the vanes (58) are steam heated.

9. An evaporator according to claim 1 or 2, characterised in that each partition (38) is provided with a weir (40) in an edge to control fluid passing thereover.

10. An evaporator according to claim 1 or 2, characterised in that nozzles (62) are located above the compartments, (42-46) for introducing make-up fluid into the compartments.

11. An evaporator according to claim 10, characterised in that the nozzles (62) are adapted to deliver a curtain of make-up fluid.

12. An evaporator according to claim 10, characterised in that the nozzles (62) are adapted to deliver a spray.

* * * * *